United States Patent [19]

Chiu et al.

[11] 4,052,557
[45] Oct. 4, 1977

[54] PHASE-JUMP DETECTOR AND CORRECTOR METHOD AND APPARATUS FOR PHASE-MODULATED COMMUNICATION SYSTEMS THAT ALSO PROVIDES A SIGNAL QUALITY INDICATION

[75] Inventors: Ran-Fun Chiu, Miami; James Bryon Sherman, North Miami; Judson Truman Gilbert, Haileah, all of Fla.

[73] Assignee: Milgo Electronic Corporation, Miami, Fla.

[21] Appl. No.: 600,608

[22] Filed: July 31, 1975

[51] Int. Cl.² .......................................... H04L 27/24
[52] U.S. Cl. .................................... 178/67; 325/344; 325/145
[58] Field of Search ................... 325/344, 145, 45, 30, 325/320; 178/67, 68, 88

[56] References Cited

U.S. PATENT DOCUMENTS

| | | | |
|---|---|---|---|
| 3,147,441 | 9/1964 | Adler | 325/344 |
| 3,663,754 | 5/1972 | Hanna, Jr. | 325/320 |
| 3,739,277 | 6/1973 | Schneider et al. | 325/30 |
| 3,753,114 | 8/1973 | Burley | 325/30 |
| 3,938,052 | 2/1976 | Glasson et al. | 325/320 |

*Primary Examiner*—Marshall M. Curtis
*Attorney, Agent, or Firm*—Jackson & Jones Law Corporation

[57] ABSTRACT

In a phase-modulated communication system utilizing voice-band communication channels wherein phase-jumps may be experienced, a phase-jump detector indicates the occurrence of such phase-jumps. A phase-jump corrector responds to the persistence of a phase-jump condition by correcting for it without requiring shut-down and complete reequalization of the transmission channel. Monitoring of the incoming signal for phase-jump occurrence provides a convenient signal quality indication that represents the magnitude of the error in the X and Y components of each received symbol.

28 Claims, 6 Drawing Figures

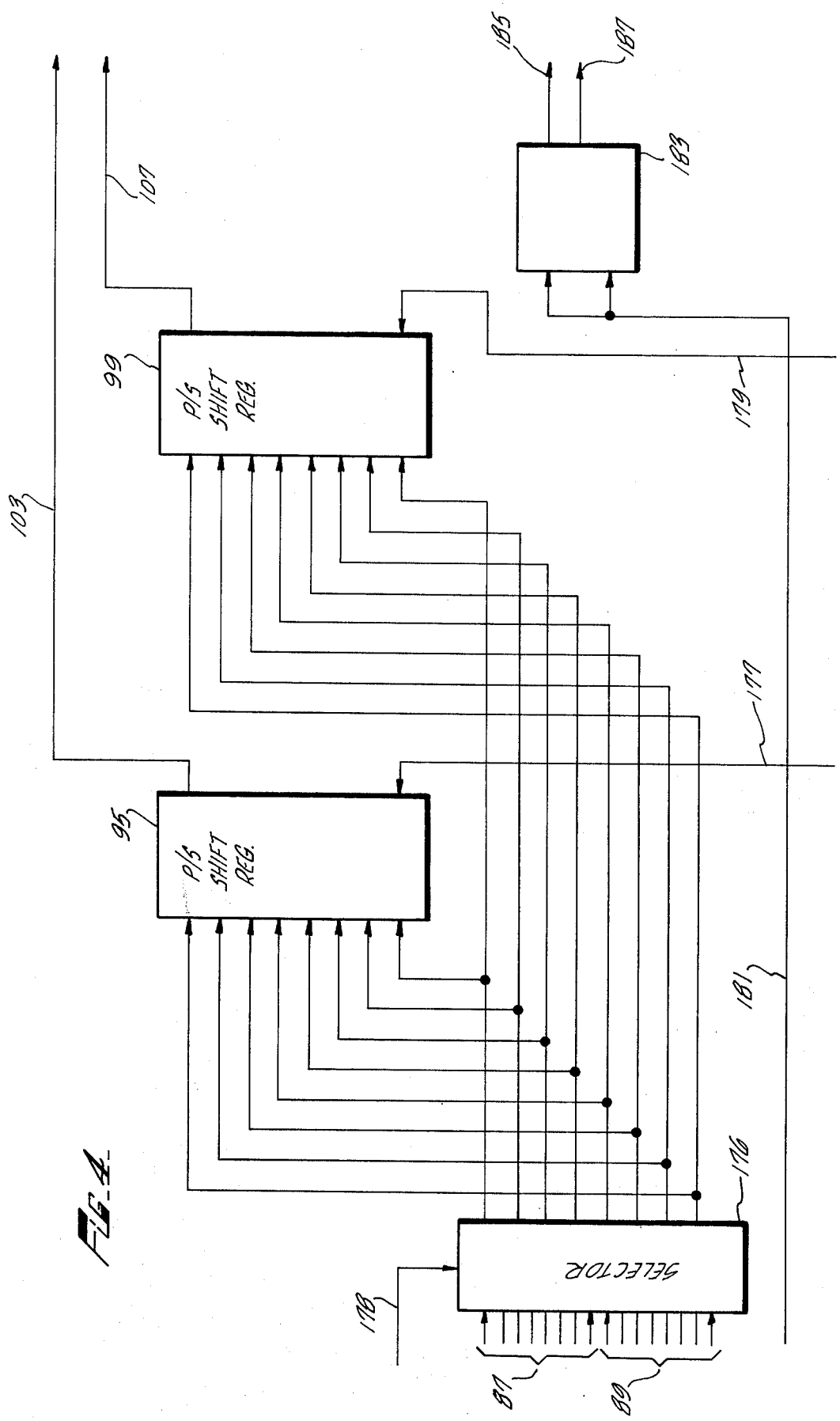

PHASE-JUMP DETECTOR AND CORRECTOR METHOD AND APPARATUS FOR PHASE-MODULATED COMMUNICATION SYSTEMS THAT ALSO PROVIDES A SIGNAL QUALITY INDICATION

CROSS REFERENCE TO RELATED APPLICATIONS

This application is related to a copending application, assigned to the same assignee as the present invention, titled "Method and Apparatus for Performing Binary Equalization in Voice-Band Phase-Modulation Modems" filed on July 3, 1975 and having U.S. Pat. No. 600,729.

BACKGROUND OF THE INVENTION

The present invention relates generally to improvements in phase-jump detector-corrects, and more particularly pertains to new and improved phase-jump detector-correctors for use with phase modulation schemes such as modified eight phase or two level eight phase modulation wherein the phase vectors are relatively displaced at N° and symmetrically disposed about the X, Y coordinates of the phase plane.

Sudden phase changes occurring on telephone voice channels are quite common. These phase changes can be caused by switching of carrier supplies not in phase, or the substitution of a broadband facility having a different propagation time. The effect in the voice channel is the creation of an equal phase change across all frequencies. Such phase changes are usually accomplished by amplitude transients during the recovery of steady state in the voide-band channel. Upon recovery, however, the phase change generated across all the frequencies remains.

Modems utilized on these voice channels usually provide equalization circuits that compensate for such phase-jumps. In the instance where modulation schemes that provide for vector symbol symmetry above the X—Y phase plane axes are used with vector spacings of 45°, a phase-jump of 45° becomes very difficult to detect. Without detecting and correcting for such a phase-jump, the equalizer operating in the voice-band modem would no longer be able to correct for the amplitude and phase distortion inherent in the voice-band channel, thereby generating decoding errors. As a result, the equalizer would have to be shut down and the line reequalized as if at start up.

OBJECTS AND SUMMARY OF THE INVENTION

An object of this invention is to provide an efficient phase-jump detector.

Another object of this invention is to provide a phase-jump compensator.

A further object of this invention is to provide a phase-jump compensator that prevents the need for reequalizing the transmission channel every time a phase-jump occurs.

Yet another object of this invention is to provide an accurate signal quality indication.

Yet a further object of this invention is to provide a method for detecting the occurrence of a phase-jump and a method for compensating for the occurrence of a phase-jump.

These objects and the general purpose of this invention are accomplished in the following manner. The invention may be implemented in either polar or Cartesian coordinate, a Cartesian system being discussed here. The X and Y components of a received symbol are compared to the ideal X and Y components of that symbol. The difference between the received X and Y components and the ideal X and Y components is an error X and error Y indication of the received symbol. After the error X and error y values are calculated, the X and Y components of the received symbol are modified to simulate a phase-jumped symbol that has been rotated by a predetermined number of degrees. The rotated X and Y components are compared with ideal X and Y components of the received symbol. The difference between the rotated X and Y components of the received symbol and the ideal X and Y components is a rotated error X and rotated error Y indication of the symbol. If a phase-jump had occurred, the rotated error X and rotated error Y indication would be smaller than the error X and error Y indication. Constantly comparing the relative magnitudes of the rotated and unrotated error indications serves to detect occurrence of a phase-jump. Upon the rotated error indications becoming smaller than the unrotated error indications and staying that way for a predetermined number of symbol times, the phase-jump is compensated for by utilizing the rotated X and rotated Y components of the received symbol, and the rotated error X and rotated error Y indications. The error X and error Y indications represent signal quality, the smaller the error X and error Y values, the better the signal quality.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts, throughout the figures thereof and wherein:

FIG. 4 is a block diagram of the storage utilized to store rotated error X and error Y values of the present invention.

FIG. 5 is a logic and block diagram of the circuitry utilized to calculate the values utilized for determining whether a 45° phase-jump occurrred.

DESCRIPTION OF THE PREFERRED EMBODIMENT

GENERAL DESCRIPTION

Figure 1:
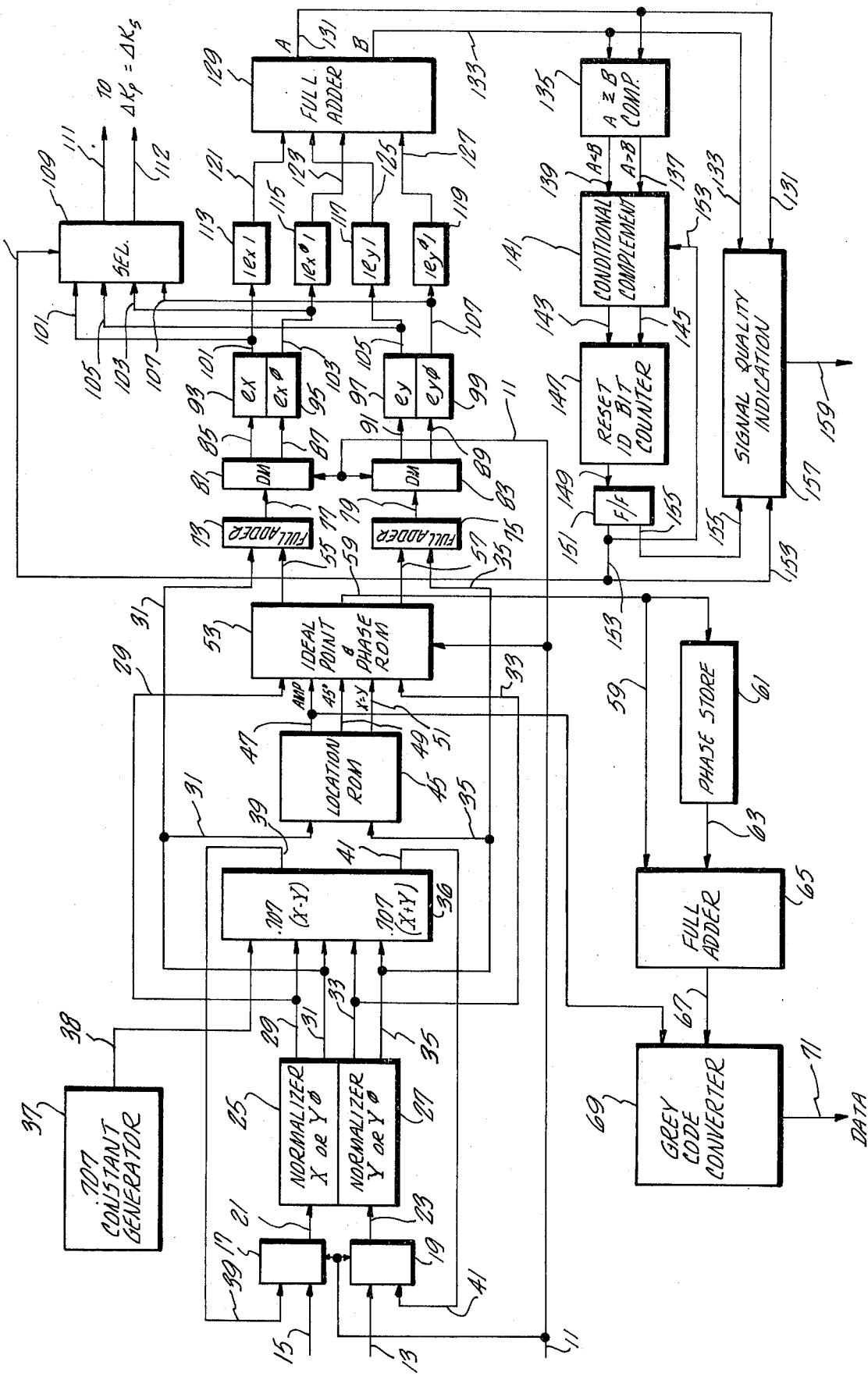
FIG. 1 is a block diagram illustrating the present phase-jump detector-corrector and signal quality indicator invention, working in conjunction with the equalizer invention of the above cross-referenced application.

FIG. 1 is a block diagram showing the association of the hardware utilized by the present invention with a portion of the hardware utilized by the invention described and the above mentioned copending application for "Method and Apparatus for Performing Binary Equalization in Voice-Band Phase-Modulated Modems". The X and Y components of a received vector symbol, corrected as explained in the above mentioned patent application are received on lines 15, 13 by selectors 17 and 19, respectively. The output of selector 17 on line 21 goes to the X component normalizer 25. The output, on line 23, of selector 19 goes to the Y component normalizer 27.

The normalizer circuitry 25, 27 for the X and Y components are fully described in the above noted copending patent application. The output of each normalizer circuit is magnitude and a sign indication for the component. Thus, normalizer 25 has a sign indication on line 29 and a magnitude indication on line 31 for each received X component. Normalizer 27 has a sign indication on line 33 and a magnitude indication on line 35 for each received Y component.

The sign and magnitude indications from both normalizers are supplied to a multiplier-adder circuit 36 and is well known in the art and will not be further described herein except to say that it is the same type of multiplier-adder circuit utilized in the above referenced copending patent application. The multiplier-adder 36 multiplies the difference between X and Y magnitudes by the constant 0.707 and the sum of the X and Y magnitudes by the constant 0.707 to generate a 45° rotated X component value on line 39 and a 45° rotated Y component value on line 41. A 0.707 constant generator 37 supplies a binary 0.707 value on line 38 to the multiplier-adder circuit 36. These rotated X and Y values are supplied as inputs to selectors 17 and 19, respectively.

The multiplier-adder 36 comes into play only after the corrected X, Y components on lines 15 and 13 have been selected by selectors 17 and 19 to be sent to normalizers 25 and 27. The output from these normalizers is sent to address a location read-only memory (ROM) 45 and an ideal point and phase read-only memory (ROM) 53. The location ROM 45 is addressed by the magnitude of the X component on line 31 and the magnitude of the Y component on line 35. The location ROM 45 generates binary indications on lines 47, 49 and 51, as explained in the above noted copending patent application. This information, in conjunction with the sign information on lines 29 and 33 addresses the ideal point and phase ROM 53. This memory contains the ideal X and Y components of the received symbol and generates these X and Y components on lines 55, 57, respectively. Line 59 carries the ideal phase of the symbol vector represented by the X and Y components on lines 55 and 57. This entire operation of generating the ideal X and Y components and phase angle upon receiving the corrected X and Y components is more fully explained in the above noted copending patent application.

The ideal X component on line 55 is supplied to a full adder 73. The other input to the adder 73 being the normalized magnitude of the X component from normalizer 25. The ideal X component line 55 carries the X value in its 2's complement form. Thereby, the addition operation by full adder 73 generates a difference indication on line 77 that is supplied to demultiplexer 81. Likewise, the ideal Y component on line 57 is supplied to a full adder 75 in 2's complement form, the other input to full adder 75 being the magnitude of the Y component from the Y normalizer 27. The output of the full adder 75 on line 79 is a difference indication between these two values. This indication is supplied to demultiplexer 83.

The select signal on line 11, besides direction selectors 17 and 19 to choose the X and Y components on lines 15 and 13, directs demultiplexers 81 and 83 to pass the information on lines 77 and 79 to lines 85 and 91, respectively. Line 85 and 91 are the input lines to the $e_x$ storage register 93 and the $e_y$ storage register 97, respectively.

Upon the $e_x$ value being stored in register 93 and the $e_y$ value being stored in register 97, the control signal on line 11 directs selectors 17 and 19 to pass the rotated component values on lines 39 and 41 to the normalizers 25 and 27, respectively. The output of the X normalizer 25 is a sign indication on line 29 and a magnitude indication on line 35 of the rotated X component. The sign indication on line 33 and the magnitude indication on line 35 are of the rotated Y component. These rotated X and Y components relate to the X and Y components previously received on lines 15 and 13 which caused the rotated X and Y components to be generated by the multiplier-adder 36.

These rotated X and Y component values are now utilized to address the location ROM 45 and the ideal point and phase ROM 53, in the same manner that the unrotated X and Y component values were utilized. The magnitudes of the rotated X component on line 31 and the magnitude of the rotated Y component on line 35 address ROM 45 causing it to read out binary information on lines 47, 49 and 51. This information along with the sign information of the rotated X and Y components on lines 29 and 33, respectively, cause the ideal point and phase ROM 53 to generate the ideal X and Y components on lines 55 and 57. The select signal on line 11 inhibits the ideal point and phase ROM 53 from generating on ideal phase indication on line 59 at this time.

As is explained in the above noted copending patent application, the ideal phase indication is stored in the phase store register 61 and compared with the ideal phase indication from the previously received vector symbol by full adder 65 which generates a phase differential indication on line 67. This phase differential is supplied to a grey code converter circuit 69. This grey code converter 69, upon receiving an amplitude indication on line 47 and the differential phase indication on line 67, generates binary data on line 71. At the time that the rotated X and Y components are being utilized to address the location ROM 45 and the ideal point and phase ROM 53, the grey code converter 69 is not generating data.

The output of the ideal point and phase ROM 53, in response to the rotated X and Y components being processed is an ideal rotated X component on line 55 and an ideal rotated Y component on line 57. The magnitude of the rotated X component is received on line 31 by full adder 73. The magnitude of the rotated Y component is received on line 35 by full adder 75. Full adder 73 generates a difference indication between these two values on line 77 for the X component, thereby generating an $e_x\Phi$ value. Full adder 75 generates a difference indication between the Y magnitudes on line 55, thereby generating an $e_y\Phi$ value. Demultiplexer 81, in response to the control signal on line 11 routes the $e_x\Phi$ information on line 77 to the $e_x\Phi$ storage register 95 by way of line 87. Likewise, the demultiplexer 83 routes the $e_y\Phi$ information on line 79 to the $e_y\Phi$ register 99 by way of input line 89.

The contents of $e_x$ storage register 93, the $e_x\Phi$ storage register 95, the $e_y$ register 97 and the $e_y\Phi$ register 99 are supplied over lines 101, 103, 105 and 107 respectively, to a selector 109 that connects either the $e_x$, $e_y$, values or the $e_x\Phi$, $e_y\Phi$, values to its output lines 111, 112. The values on lines 111 and 112 are utilized to calculate the equalization constants that correct the raw X and Y components representing the received vector symbol. Such operation is fully explained in the above noted copending patent application. Whether the $e_x$, $e_y$ information or the $e_x\Phi$, $e_y\Phi$ information is selected, depends upon the signal on line 153 supplied to selector 109 from flip-flop 151.

The $e_x\Phi$ and $e_y\Phi$ from registers 95, 99, respectively, are selected only when it has been determined that a phase-jump has occurred in the communication link. The following procedure is utilized to determine whether a phase-jump has occurred. The $e_x$, $e_x\Phi$, $e_y$ and $e_y\Phi$ values in registers 93, 95, 97 and 99, respectively are supplied to logic circuitry 113, 115, 117 and 119, respectively. These logic circuits generate the absolute magnitude of the binary information in the registers 93, 95, 97 and 99, respectively. The absolute magnitude of $e_x$ from logic circuitry 112 is supplied, over line 121, to a full adder 129. Line 123 supplies the $e_x\Phi$ absolute magnitude, line 125 supplies the $e_y$ magnitude and line 127 supplies the $e_y\Phi$ magnitude to the full adder 129.

The full adder 129 generates a pair of output indications, for convenience called A and B on lines 131 and 133, respectively. The A indication represents the binary sum of the absolute values of $e_x$ and $e_y$. The B indication represents the binary sum of the absolute values of $e_x\Phi$ and $e_y\Phi$.

In other words $$A = |e_x| + |e_y|$$

$$B = |e_x\Phi| + |e_y\Phi|$$

These A and B values are supplied to a comparator circuit 135 that generates an A>B signal on line 137, and an A<B signal on line 139. As long as the B indication is larger or equal to the A indication, no phase-jump is assumed to have occurred. However, if the A indication becomes larger than the B indication, a phase-jump is indicated.

If A is smaller than B the signal on line 139 passes through conditional complement logic 141 onto line 143 causing a reset counter 147 to generate a signal on line 149 which is supplied to flip-flop 151. The flip-flop 151 generates a signal on line 153 which is supplied to the selector 109, directing the selector to choose the $e_x$ and $e_y$ values from registers 93, 97, respectively for connection to lines 111 and 112. The signal on line 153 is also transmitted to signal quality indicator logic 157 that will pass the A indication received on line 131 to line 159, this A value indicating the quality of the vector symbol received.

If the A indication happens to be larger than the B indication, the signal on line 137 from comparator 135 passes through the conditional complement logic 141 which generates a signal on line 145, causing the reset counter 147 to start counting. Counter 147 will continue counting for as long as the signal on line 145 indicates that A is larger than B. Upon the passage of ten comparisons, the counter 147 generates a signal on line 149 that causes flip-flop 151 to generate a signal on 153. The signal on 153 directs selector 109 to connect the $e_x\Phi$, $e_y\Phi$ values out of registers 95, 99, respectively 95, 99, respectively, to lines 111 and 112. The signal output, on line 155, of flip-flop 151 directs the signal quality indication logic 157 to select the B indication on line 133 as the value to be supplied to line 159, this B value indicating the quality of the received vector symbol.

The output signal of flip-flop 151 on line 153 is fed back to the conditional complement logic 141 to switch line 139 to the A greater than B line and line 137 to the A less than B line, since the rotated X and Y components are now the correct X and Y components acting as the standard against which future rotation must be checked.

CONSTANT GENERATOR

Figure 2:
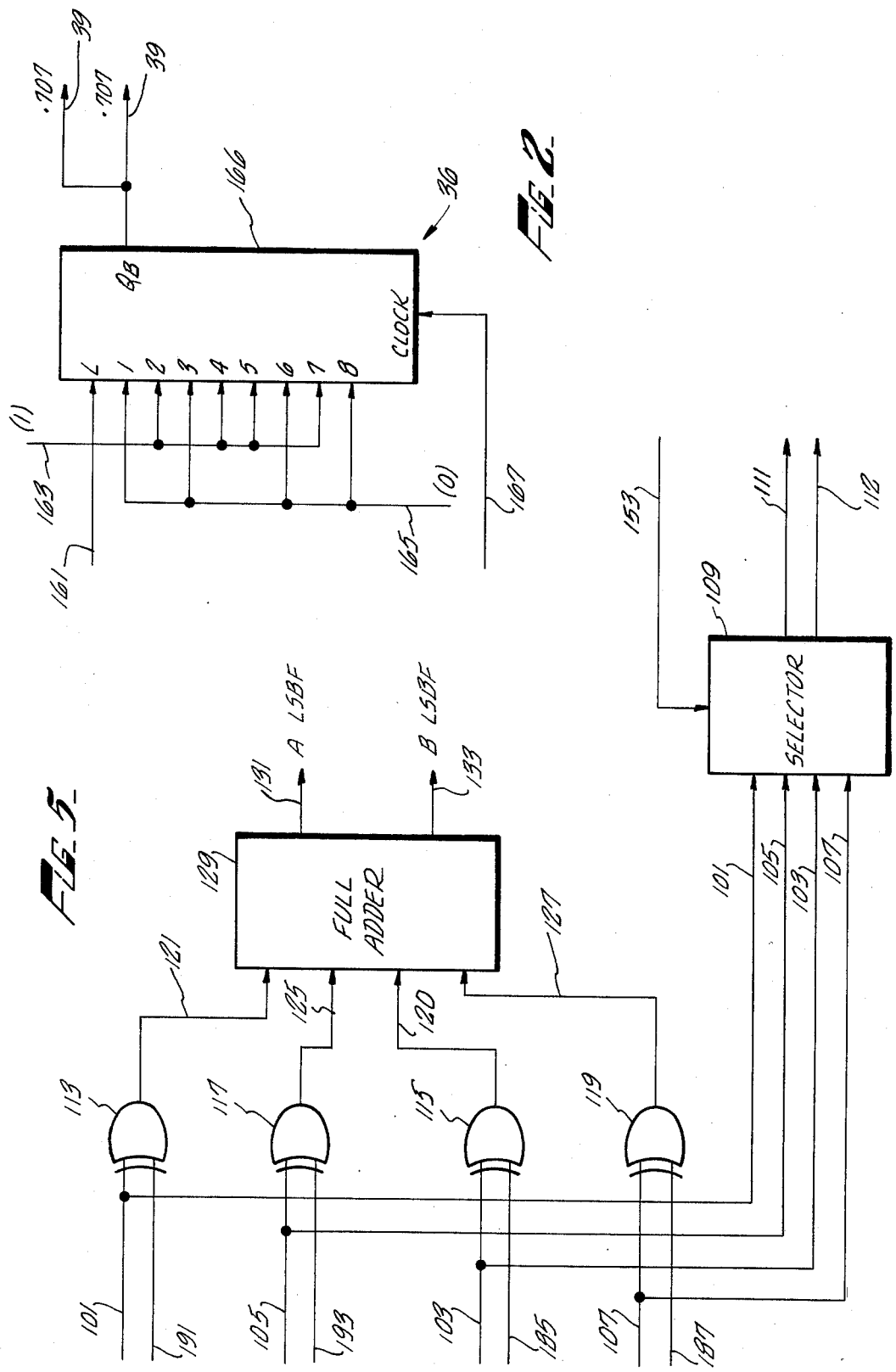
FIG. 2 is a block diagram of the 0.707 constant generator utilized in the present invention.

The constant generator 37 is shown in FIG. 2 as consisting of an eight bit parallel-in/serial-out shift register that stores the binary indication for the decimal fraction 0.707. It should be understood that this constant is utilized for the detection of 45° phase jumps. For systems that utilize other than 45° spacing between the phase vectors, different appropriate constants must be utilized. A source of clock signals on line 167 clocks the binary information stored therein, in serial fashion, out of the $Q_8$ output on lines 39 of the register 166. Register 166 receives a binary zero, at its 1, 3, 6 and 8 inputs and a binary 1 at its 2, 4, 5 and 7 inputs. The number 1 input acts as a sign bit. The number 2 input is the most significant bit of the fraction 0.707. The serial output of the register 166 would be most significant bit first in this order: 01011010. This string of binary ones and zeros represents the decimal point fraction 0.707. The binary 0.707 constant is clocked out of the register 166 after a load command is received on line 161.

ROTATED X AND Y COMPONENT CALCULATION

Figure 3:
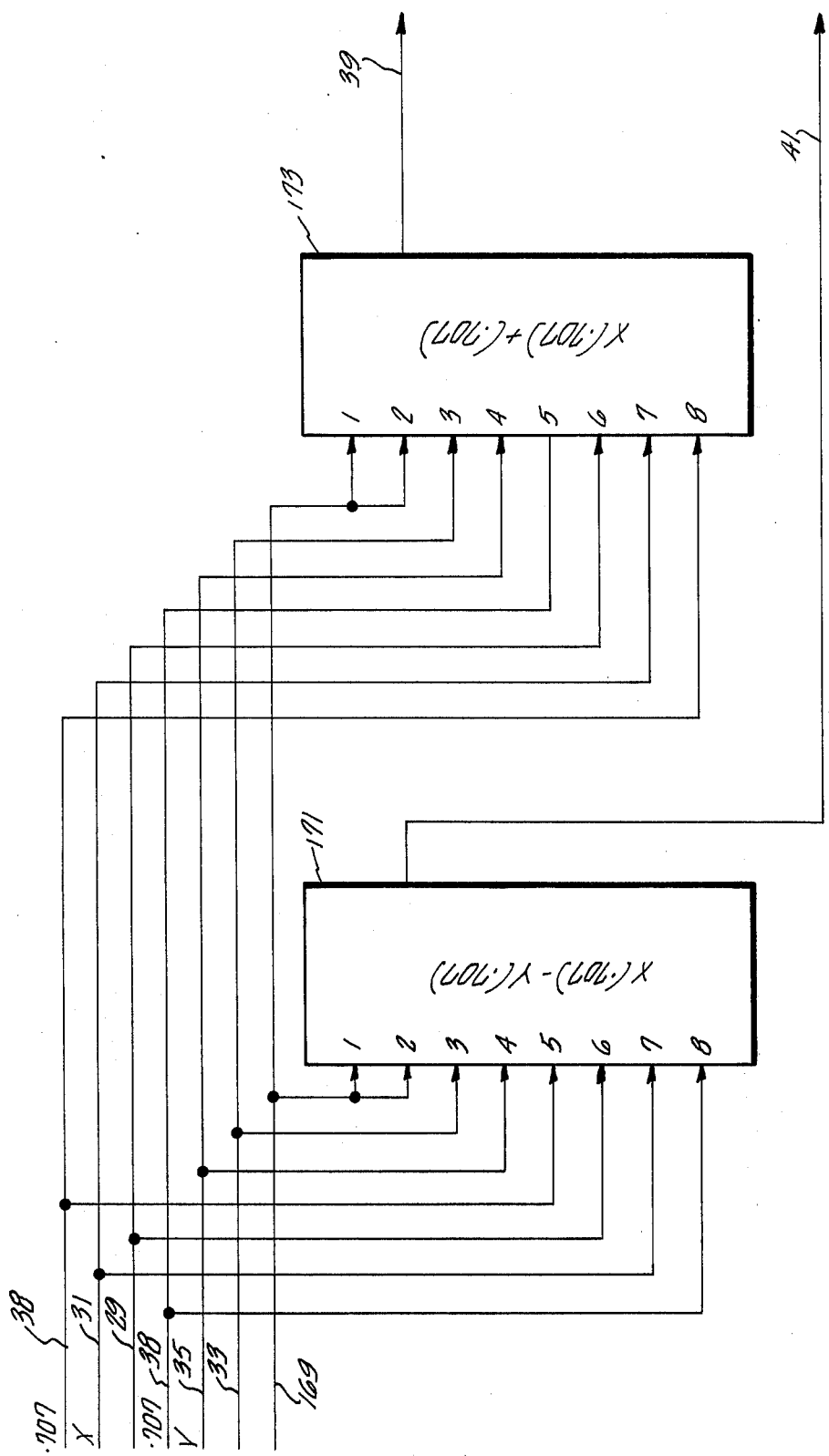
FIG. 3 is a block diagram of the multiplier adder circuits utilized in the present invention.

The constant on line 39 is supplied to both a rotated X multiplier-adder circuit 171 and a rotated Y multiplier-adder circuit 173 (FIG. 3). A rotated X component value is generated by multiplier-adder circuit 171 in accordance with the equation:

$$X^\Phi = K_1 X_N - K_2 Y_N$$

The 45° rotated Y component value is generated by multiplier-adder circuit 173 according to the equation:

$$Y^\Phi = K_1 X_N - K_2 Y_N$$

for a rotation of 45°, $K_1 = \cos 45°$, $K_2 = \sin 45°$

The multiplier-adder 171 for generating the 45° rotated X component value on line 41, receives a multiply command signal on line 169, a sign of Y component indication on line 33, a Y magnitude indication on line 35, a sign of X component indication on line 29, and an X magnitude indication on line 31. The magnitudes of the X and Y components on lines 31 and 35 respectively are loaded into the multiplier-adder 171 least significant bit first. The multiplier-adder 173 for generating the 45° Y rotated component on line 39 also receives the X and Y component magnitude signals least significant bit first, on lines 31 and 35, respectively. It receives the sign of X and sign Y information on lines 29 and 33, respectively.

Multiplier-adder 171 receives a multiply command at inputs 1 and 2. It receives the sign of Y information at input 3, the Y magnitude information, least significant bit first, an input 4, a 0.707 constant information at input 5, the sign of X information at input 6, the X magnitude information at input 7 and a 0.707 constant information at input 8. Multiplier-adder 173 receives a multiply command at inputs 1 and 2, the sign of Y information at input 3, magnitude of Y information at input 4, 0.707 constant information at input 5, sign of X information at input 6, magnitude X information at input 7 and 0.707 constant information at input 8. Upon a multiply command indication on line 169, the multiplier-adder chips 171, 173, respectively generate the 45° rotated X component and Y component values on lines 41 and 39. These rotated X and Y components values are supplied to selectors 17 and 19, respectively (FIG. 1) from where they are supplied to the normalizers and furtheron, as above described.

Upon full adder 73 (FIG. 1) generating the $e_x\Phi$ value, the magnitude information is placed on parallel lines 87 and routed into $e_x\Phi$ storage register 95 by a load command on line 177 and select signal on line 178 directing selector 176 (FIG. 4) to connect input lines 87 to its output lines. The $e_x\Phi$ register 95 is a parallel in/serial-out shift register that produces the $e_x\Phi$ values in serial fashion on output line 103. Upon full adder 75 generating the $e_y\Phi$ value on lines 89, selector 176 (FIG. 4), in response to the control signal on line 178 connects lines 89 to its output lines. This information is loaded into the $e_y\Phi$ register 99 in response to a load command on line 179. The $e_y\Phi$ register 99 is a parallel-input/serial-output register that produces the binary values stored therein in serial fashion on line 107. In addition to the magnitude of $e_x\Phi$ and $e_y\Phi$ information, the full adders 73, 75 supply a sign indication for the $e_x\Phi$ and $e_y\Phi$ values on line 181. These sign indications are stored in $e_x\Phi$, $e_y\Phi$ sign storage register 183. These sign indications which are one bit long are made available on lines 185 and 187.

VECTOR SYMBOL SIGNAL QUALITY INDICATIONS

In order to calculate the equations:

$$A = |e_x| + |e_y| \text{ and}$$

$$B = |e_x\Phi| + |e_y\Phi|$$

where A is the signal quality indication for an unrotated symbol and B is the signal quality indication for the symbol rotated 45°, the $e_x$ and $e_y$ information received from storage registers 93, 95, 97 and 99 (FIG. 1) must be converted into absolute magnitude indications. This is accomplished by an approximation of a 2's complement operation in which the $e_x$, $e_y$ and $e_x\Phi$ and $e_y\Phi$ binary information is complemented conditionally on the basis of the sign indication for the respective magnitude indications. The $e_x$ magnitude indication is received by an Exclusive OR gate 113 on line 101 along with the sign of $e_x$ indication on line 191. The output of Exclusive OR gate 113 is an absolute magnitude of $e_x$ indication on line 121. The $e_y$ indication is received by an Exclusive OR gate 117 which also receives a sign of $e_y$ indication on line 193. The output of the Exclusive OR gate 117 is a magnitude of $e_y$ indication on line 125. Exclusive OR gate 115 receives a $e_x\Phi$ indication on line 103 and a sign of $e_x\Phi$ indication on line 185 generating an absolute magnitude $e_x\Phi$ indication on line 115. Likewise, Exclusive OR gate 119 receives a $e_y\Phi$ indication on line 107 and a sign $e_y\Phi$ indication on line 187, generating in response thereto, an absolute magnitude of $e_y\Phi$ indication on line 127.

A double full adder 129 receives the binary information on lines 121, 125, 115, 127. In response to the $e_x$ and $e_y$ information on lines 121 and 125, respectively, the full adder 129 generates the A signal quality indication on line 131, least significant bit first. In response to the $e_x\Phi$ and $e_y\Phi$ information on lines 115 and 127, respectively, the full adder 129 generates the B signal quality information on line 133, least significant bit first.

The $e_x$, $e_y$, $e_x\Phi$ and $e_y\Phi$ binary information is also supplied to a selector 109, over lines 101, 105, 103 and 107. Upon the control signal on line 153 indicating that a 45° phase-jump had occurred the selector 109 would respond thereto by disconnecting lines 101 and 105 from lines 111 and 112 and connecting lines 103 and 107 to lines 111 and 112. Lines 111 and 112 go to logic circuitry, described in the above-noted copending patent application, for calculating the equalization constants that are to be used in correcting the X and Y components of the received vector symbols.

An alternate preferred embodiment for the generator of a quality indication signal is apparatus for calculating the equation:

$$A = |e_x|^2 + |e_y|^2$$

$$B = |e_x\Phi| + |e_y|^2$$

The apparatus for generating the square of the rotated and unrotated $e_x$ and $e_y$ which is seen as well within the purview of a person of ordinary skill in the art and will not be disclosed herein.

PHASE-JUMP DETECTION

Figure 6:
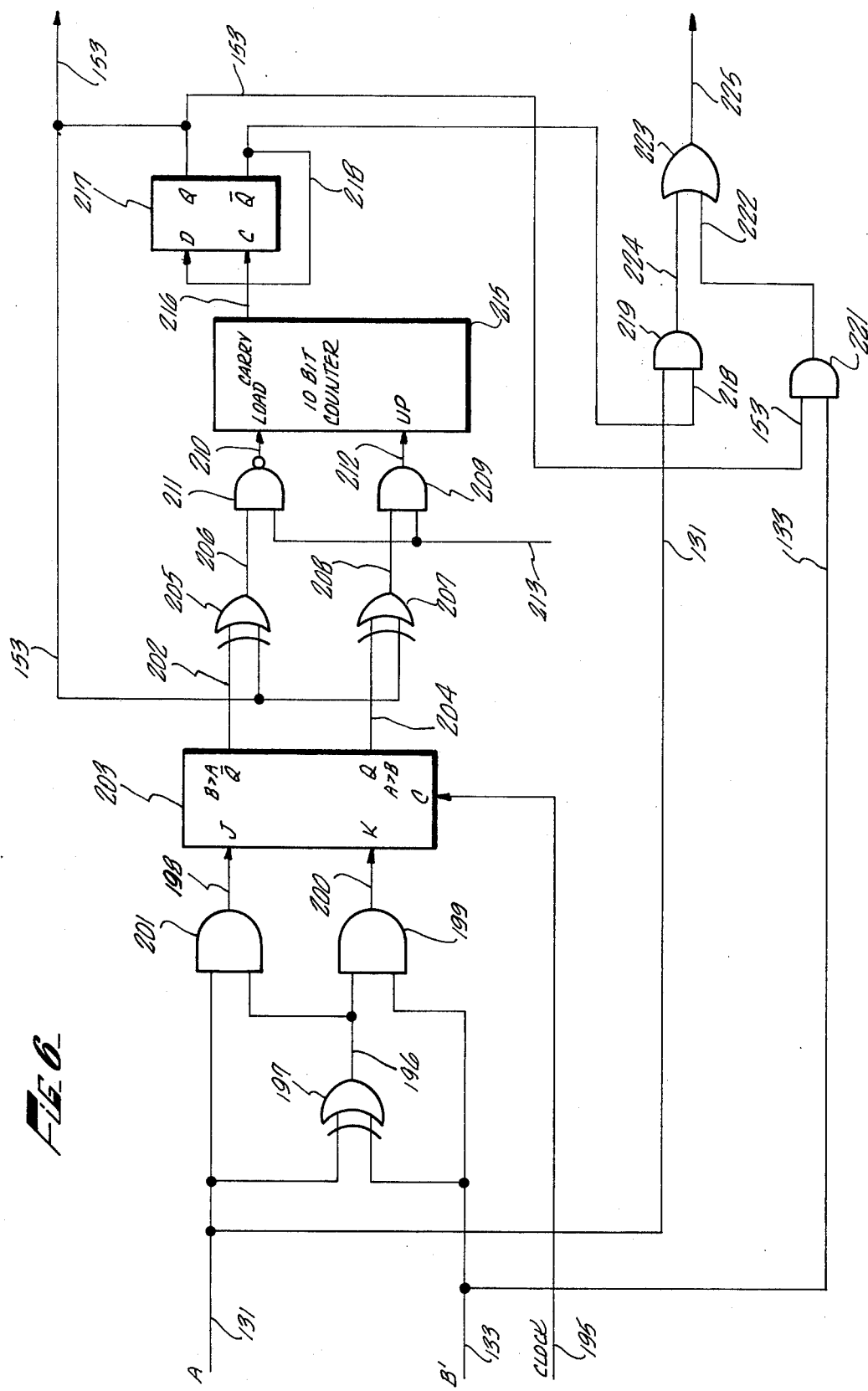
FIG. 6 is a logic and block diagram of the circuitry that detects whether a 45° phase-jump has occurred and also indicates the signal quality of the vector symbols being received.

The A in-phase error indication and the B rotated error indication is received least significant bit first on lines 131 and 133 by an Exclusive OR gate 197 and a pair of AND gates 201, 199 (FIG. 6). The A and B indications from full adder 129 (FIG. 5) are generated simultaneously so that comparable bits are compared by Exclusive OR gate 197 (FIG. 6). Whenever the bit received on line 131 is identical to the bit on line 133, the output of Exclusive OR gate 197, on line 196, is a binary zero. This binary zero disables AND gates 199 and 201 thereby causing binary zeros to be placed on lines 198 and 200 which go to the J and K inputs, respectively, of JK flip-flop 203. At the time a clock pulse is received on line 195 by the JK flip-flop 203 the outputs Q and $\overline{Q}$ of the flip-flop will not change because of the binary zero signals on lines 198 and 200. Assuming now that the binary bit received on line 131 is a binary 1 while the bit received on line 133, at the same time, is a binary zero, the output of Exclusive OR gate 197 is a binary 1. This binary 1 level is supplied to AND gates 201 and 199 causing these AND gates to be enabled. AND gate 201 will pass the binary 1 information on line 131 to line 198. AND gate 199 will pass the binary zero information on line 133 to line 200. As a consequence of a binary 1 on line 198 and a binary zero on line 200, at the time of occurrence of the next clock pulse on line 195, the JK flip-flop 203, irrespective of the previous outputs, will have a binary 1 output signal on line 204 and a binary zero output on line 202. Assuming now that the binary information on line 131 is a binary zero at the time that the binary information on line 133 is a binary 1, Exclusive OR gate 197 will generate a binary 1 at its output on line 196. This binary 1 information enables AND gates 199 and 201. As a consequence, AND gate 201 passes the binary zero information on line 131 to the output line 198 and AND gate 199 passes the binary 1 information on line 133 to its output line 200. As a result of a binary zero on line 198 and a binary 1 on line 200, at the occurrence of the next clock signal, on line 195, the JK flip-flop 203, irrespective of its previous output signals, will have a binary 1 on output line 202 and a binary zero on output line 204.

The above described interaction between Exclusive OR gate 197, AND gates 201 and 199 and JK flip-flop 203 occurs for all the bits of the A and B indications. As a consequence of this interaction, at the reception of the most significant bits of such A and B indications on lines 131 and 133, respectively, the Q and $\overline{Q}$ outputs on line 204 and 202, respectively, of JK flip-flop 203 indicate whether the A binary indication is larger than the B binary indication or the B indication is larger than the A indication. Therefore, if, as a consequence of the most significant bits of the A and B indications being received on lines 131 and 133, the JK flip-flop 203 generates a binary 1 indication on Q output 202, this means that the B error indication is larger than the error indication is larger than the A error indication. In the alternative, if the JK flip-flop 203 generates a binary 1 on output 204, this means that the A binary indication is larger than the B binary indication.

Assuming that the system has been running without the occurrence of a 45° phase-jump, the D-type flip-flop 217 will have a binary zero signal on Q output line 153 and a binary one signal on $\overline{Q}$ output line 218. The binary 1 signal on line 218 is supplied to AND gate 219 thereby enabling that AND gate to pass the A indication bits being received on line 131 to OR gate 223 over lines 224. The binary zero signal on line 153 is supplied to AND gate 221 preventing that AND gate from passing any B information being received at line 133. OR gate 223 will supply the information received on line 224 to line 225. This information serves as the signal quality indicating information for the received vector symbol.

The Q output of D-type flip-flop 217 is supplied to the selector 109 (FIG. 5) as the control signal for directing whether the $e_x$, $e_y$ components or the $e_x\Phi$, $e_y\Phi$ components are to be selected. The Q output signal indication is also fed back to the inputs of two Exclusive OR gates 205 and 207. The $\overline{Q}$ signal indication is fed back to the D input of flip-flop 217. With the signal on line 153 being a binary zero, Exclusive OR gates 205 and 207 have no effect on the binary signals appearing on lines 202 and 204, in effect, simply passing them on to lines 206, 208, respectively. The signals on lines 206 and 208 are the first input to the NAND gate 211 and an AND gate 209, respectively. The other inputs to the NAND gate and AND gate is a strobe signal on line 213 that is present is a binary 1 only when the most significant bit of the A and B indications are being presented on lines 131 and 133.

Assuming for purposes of example, that no phase-jump has occurred, thereby leaving the Q output of flip-flop 217 on line 153 a binary zero, and $\overline{Q}$ output of JK flip-flop 203 a binary 1 while the Q output on line 204 is a binary zero, indicating that the rotated error indication B is larger than the unrotated error indication A. As a consequence, the output of Exclusive OR gate 205, on line 206, is a binary 1, while the output of Exclusive OR gate 207, on line 208, is a binary zero. At the occurrence of a binary one indication on strobe line 213, the output of NAND gate 211 on line 210 is a binary zero while the output of AND gate 209 on line 212 is a binary one, thereby loading a logic zero into the 10-bit binary counter 215.

Assume now that the Q output of JK flip-flop 203 is a binary 1 on line 204 and the $\overline{Q}$ output of flip-flop 203 is a binary zero on line 202, indicating a possible phase-jump. The Q output of D-type flip-flop 217 on line 153 is still a binary zero, causing the output of Exclusive OR gate 207, on line 208, to be a binary 1. The output of Exclusive OR gate 205 on line 206, will be a binary zero. At the occurrence of the strobe pulse, on line 213, the output of NAND gate 211 on line 210 would be a binary 1 while the output of AND gate 209, on line 212, will also be a binary 1, thereby loading a logic one level into the 10-bit counter 215. If the Q output of JK flip-flop 213 is a binary one for ten consecutive strobe pulses, the module of the 10-bit counter 215 is exceeded and a binary one indication appears on line 216. It should be remembered that the strobe pulse appears on line 213 every time that a vector symbol is received.

The occurrence of a binary 1 signal on line 216 is an indication that the unrotated error indication was larger than the 4520 rotated error indication for 10 consecutive received vector symbols. It is assumed from this indication that a phase-jump has occurred. The logic 1 symbol on line 216 will, therefore, clock the binary 1 $\overline{Q}$ output of flip-flop 217 into the D input, thereby changing the Q output of the flip-flop from a logic zero to a logic 1 and the $\overline{Q}$ output from a logic 1 to a logic 0. As a consequence of this change of state, the selector 109 (FIG. 5) will exit the $e_x\Phi$ and $e_y\Phi$ values to lines 111 and 112 and the Q output signal on line 153 will enable AND gate 221 to pass the B error information to OR gate 223 thereby changing the signal quality indicating signal from the A to the B error indication. In addition, the binary 1 Q output signal on line 153 is supplied to Exclusive OR gates 205 and 207, causing them to complement any binary information received on lines 202 and 204, respectively. As a result of this complementing action, the $\overline{Q}$ output of JK flip-flop 203 will represent the condition, A < B, and the Q output will represent the condition A > B. It can be seen that in this complemented mode whenever the $\overline{Q}$ output, 202 of JK-flip-flop 203 is a binary 1, indicating that the error A indication is larger than the error B indication, the error B now being the reference of zero phase-jump signal, the 10-bit counter 215 is loaded with a logic 1 level at the occurrence of the strobe pulse 213. If this situation persists for 10-bit times a binary 1 signal will be supplied to output line 216, clocking the logic zero from the $\overline{Q}$ output of D-type flip-flop 217 into the D input. This will cause the Q output on line 153 to become a binary zero and re-establish the error A indication as the reference or zero phase-jump reference.

What has been described herein is a phase-jump detector for phase modulated binary information that also provides a means for automatically compensating for the occurrence of a phase-jump in a manner that eliminates the requirement for re-equalizing the entire transmission channel every time that a phase-jump occurs. In addition to detecting and correcting for the occurrence of phase-jumps, the invention provides a highly accurate signal quality indication that represents the quality of the vector symbol being received.

Obviously many modifications and variations of the present invention are possible in light of the above teachings, it is, therefore, to be understood that within the scope of the appended claims the invention may be practiced otherwise than as specifically described.

What is claimed is:

1. A method for detecting the occurrence of phase-jumps in a phase-modulated voice-band communication system wherein received phase symbols are converted into binary X and binary Y components, said method comprising:

generating an error X and error Y indication that represents the difference between the binary X and binary Y components of a received symbol and the ideal binary X and binary Y components of that symbol;

generating a rotated error X and rotated error Y indication that represents the difference between the binary X and binary Y components of and received symbol rotated by N degrees and the ideal binary X and binary Y components of the rotated symbol; and comparing the magnitude of the error X and error Y indication with the rotated error X and rotated error Y indication.

2. The method of claim 1 wherein said error X and error Y generating step includes:

receiving the binary X and binary Y component of the received symbol; and subtracting the ideal binary Y component and binary Y component of the received symbol from the received binary X and binary Y component.

3. The method of claim 2 further comprising, after said receiving step:

addressing a memory means with the binary X and binary Y components of the received symbol, said memory containing the ideal binary X and binary Y component of the received symbol.

4. The method of claim 1 wherein said rotated error X and rotated error Y generating step includes:

receiving the binary X and binary Y component of the received symbol;

modifying the received binary X and binary Y components to represent the received symbol rotated by N degrees; and subtracting the ideal rotated binary X and binary Y component from the modified binary X and binary Y component.

5. The method of claim 4 wherein said modifying step comprises:

multiplying the received binary X component minus the received binary Y component by 0.707 to obtain the rotated binary X component; and multiplying the received binary X component plus the received binary Y component by 0.707 to obtain the rotated binary Y component.

6. The method of claim 4 further comprising, after said modifying step:

addressing a memory means with the rotated binary X and binary Y components, said memory containing the ideal rotated binary X and binary Y components of the rotated symbol.

7. A method for detecting the occurrence of phase-jumps in a phase modulated voice-band communication system wherein received phase symbols are converted into binary X and binary Y components, said method comprising:

comparing the binary X and binary Y components of the received symbol with the ideal binary X and binary Y components of that symbol;

generating an error X and error Y indication that represents the difference between the received and the ideal binary X and binary Y components;

generating a rotated binary X and binary Y component that represents the received symbol rotated N degrees;

comparing the binary X and binary Y component of the rotated symbol with the ideal binary X and binary Y components of the rotated symbol;

generating a rotated error X and rotated error Y indication that represents the difference between the received rotated and the ideal rotated binary X and binary Y components; and comparing the magnitude of the error X and error Y indication with the magnitude of the rotated error X and rotated error Y indication.

8. The method of claim 7 wherein said comparing step comprises:

addressing a memory means with the binary X and binary Y components of the received symbol, said memory containing the ideal binary X and binary Y components of the received symbol.

9. The method of claim 8 wherein said error X and error Y generating step includes:

receiving the binary X and binary Y component of the received symbol;

subtracting the ideal binary X component and binary Y component of the received symbol from the received binary X and binary Y component; and storing the result.

10. The method of claim 9 wherein said rotated binary X and binary Y generating step, includes:

multiplying the received binary X component minus the received binary Y component by 0.707 to obtain the rotated binary X component; and multiplying the received binary X component plus the received binary Y component by 0.707 to obtain the rotated binary Y component.

11. The method of claim 10 wherein said comparing step, includes:

addressing a memory means with the rotated binary X and binary Y components, said memory containing the ideal rotated binary X and binary Y components of the rotated symbol.

12. The method of claim 11 wherein said rotated error X and rotated error Y generating step, includes:

subtracting the ideal rotated binary X and binary Y components of the rotated symbol from the rotated binary X and binary Y components.

13. The method of claim 12 wherein said magnitude comparing step, includes:

adding the error X and error Y indications to obtain a composite unrotated error indication;

adding the rotated error X and error Y indications to obtain a composite rotated error indication; and comparing the magnitude of the composite unrotated error indication with the magnitude of the composite rotated error indication.

14. The method of claim 7 wherein said magnitude comparing step, includes:

adding the error X and error Y indications to obtain a composite unrotated error indication;

adding the rotated error X and error Y indication to obtain a composite rotated error indication; and comparing the magnitude of the composite unrotated error indication with the mgnitude of the composite rotated error indication.

15. A method for producing a signal quality indication in a phase-modulated voice-band communication system wherein received symbols are converted into binary X and binary Y components, said method comprising:

comparing the binary X and binary Y components of the received symbol with the ideal binary X and binary Y components of that symbol;

generating an error X and error Y indication that represents the difference between the received and the ideal binary X and binary Y components; and combining the error X and error Y indications to produce a signal quality indication.

16. The method of claim 15 wherein said comparing step comprises:

addressing a memory means with the binary X and binary Y components of the received symbol, said memory containing the ideal binary X and binary Y components of the received symbol.

17. The method of claim 16 wherein said error X and error Y generating step includes:

receiving the binary X and binary Y components of the received symbol; and subtracting the ideal binary X component and binary Y component of the received symbol from the received binary X and binary Y components.

18. In a phase-modulated voice-band communication system wherein received phase symbols are converted into binary X and binary Y components, apparatus for detecting the occurrence of phase-jumps therein comprising:

means for generating an error X and error Y indication that represents the difference between the binary X and binary Y components of a received symbol and the ideal binary X and binary Y components of that symbol;

means for generating a rotated error X and rotated error Y indication that represents the difference between the binary X and binary Y components of the received symbol rotated by N degrees and the ideal binary X and binary Y components of the rotated symbol; and means for comparing the magnitude of the error X and error Y indication with the rotated error X and rotated error Y indication.

19. The apparatus of claim 18 wherein said error X and error Y generating means, comprises:

means for subtracting the ideal binary X component and binary Y component of the received symbol from the received binary X and binary Y component.

20. The apparatus of claim 19, further comprising: memory means addressable with the binary X and binary Y components of the received symbol, said memory means containing the ideal binary X and binary Y components of the received symbol.

21. The apparatus of claim 18 wherein said rotated error X and rotated error Y generating means, comprises:

means for modifying the received binary X and binary Y components to represent the received symbol rotated by N degrees; and means for subtracting the ideal rotated binary X and binary Y components from the modified binary X and binary Y components.

22. The apparatus of claim 21 wherein said modifying means comprises:

means for multiplying the received binary X component minus the received binary Y component by 0.707 to obtain the rotated binary X component; and means for multiplying the received binary X component plus the received binary Y component by 0.707 to obtain the rotated binary Y component.

23. The apparatus of claim 21 further comprising: memory means addressable with the binary X and binary Y components, said memory means containing the ideal rotated binary X and binary Y components of the rotated symbol.

24. In a phase-modulated voice-band communication system wherein received phase symbols are converted into binary X and binary Y components, apparatus for producing a signal quality indication, comprising:

means for generating an error X and error Y indication that represents the difference between the received and ideal binary X and binary Y components; and means for combining the error X and error Y indication to produce a signal quality indication.

25. The apparatus of claim 24 further comprising: memory means addressable by the binary X and binary Y components of the received symbol, said memory means containing the ideal binary X and binary Y components of the received symbol.

26. The apparatus of claim 24 wherein said error X and error Y generating means, comprising: means for subtracting the ideal binary X component and binary Y component of the received symbol from the received binary X and binary Y component.

27. In a phase-modulated voice-band communication system wherein received phase symbols are converted into binary X and binary Y components, apparatus for compensating for phase-jumps in the communication system, comprising:

means for detecting the occurrence of a phase-jump; and means for correcting for the phase-jump.

28. In a phase-modulated voice-band communication system wherein received phase symbols are converted into binary X and binary Y components, apparatus for compensating for N degree phase-jumps in the communication line, comprising:

means for detecting the occurrence of an N degree phase-jump; and means for modifying the binary X and binary Y components of the received symbols by N degrees.

* * * * *

UNITED STATES PATENT AND TRADEMARK OFFICE
CERTIFICATE OF CORRECTION

PATENT NO. : 4,052,557
DATED : October 4, 1977
INVENTOR(S) : Ran-Fun Chiu, James Bryon Sherman and Judson Truman Gilbert It is certified that error appears in the above-identified patent and that said Letters Patent are hereby corrected as shown below:

Col. 1, Line 14, change "July 3, 1975" to --July 31, 1975--.
      Line 19, change "detector-corrects" to --detector correctors--.

Line 32/33, change "accomplished" to --accompanied--.
      Line 34, change "voide-band" to --voice-band--.

Col. 2, Line 8, change "y" to --Y--.

Col. 3, Line 20, change "and is" to --that is--.
      Line 24, add "the" after --between--.

Col. 5, Line 65/66, after "respectively" delete --95, 99, respectively--.

Col. 7, Line 22, after "$e_y$" delete --101--.

Col. 9, Line 16/17, after "than the" delete --error indication is larger than the--.

Col. 10, Line 16, change "4520" to --45°--.

Col. 12, Line 59, change "mgnitude" to --magnitude--.

Signed and Sealed this

Fourteenth Day of February 1978

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,052,557
DATED : October 4, 1977
INVENTOR(S) : Ran-Fun Chiu, James Bryon Sherman, and Judson Truman Gilbert It is certified that error appears in the above-identified patent and that said Letters Patent are hereby corrected as shown below:

Col. 1, Line 14, change "Pat." to -- Serial --.

Signed and Sealed this

Thirty-first Day of October 1978

[SEAL]

Attest:

RUTH C. MASON
Attesting Officer

DONALD W. BANNER
Commissioner of Patents and Trademarks